US005885335A

United States Patent [19]
Adams et al.

[11] Patent Number: 5,885,335
[45] Date of Patent: *Mar. 23, 1999

[54] MODIFIED CARBON PRODUCTS AND INKS AND COATINGS CONTAINING MODIFIED CARBON PRODUCTS

[75] Inventors: Curtis E. Adams, Watertown; James A. Belmont, Acton, both of Mass.

[73] Assignee: Cabot Corporation, Boston, Mass.

[ * ] Notice: The term of this patent shall not extend beyond the expiration date of Pat. No. 5,571,311.

[21] Appl. No.: 873,021

[22] Filed: Jun. 11, 1997

Related U.S. Application Data

[63] Continuation-in-part of Ser. No. 663,707, Jun. 14, 1996, Pat. No. 5,707,432.

[51] Int. Cl.$^6$ ................................................ C09D 11/02
[52] U.S. Cl. ................... 106/316; 106/31.75; 106/31.77; 106/476
[58] Field of Search ................................ 106/31.6, 31.75, 106/31.77, 476

[56] References Cited

U.S. PATENT DOCUMENTS

| | | | |
|---|---|---|---|
| T860,001 | 3/1969 | Gessler | 260/41.5 |
| 2,121,535 | 6/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon | 106/30 R |

(List continued on next page.)

FOREIGN PATENT DOCUMENTS

| | | |
|---|---|---|
| 0 006 190 A1 | 1/1980 | European Pat. Off. . |
| 0 475 075 A1 | 3/1992 | European Pat. Off. . |
| 0 050 354 | 4/1992 | European Pat. Off. . |
| E 72775 | 4/1960 | France . |
| 1331889 | 5/1963 | France . |
| 1948443 | 4/1971 | Germany . |
| 23 55 758 | 5/1975 | Germany . |
| 56078629 | 6/1981 | Japan . |
| 59/82467 | 5/1984 | Japan . |
| 62/250073 | 10/1987 | Japan . |
| 6067421 | 3/1994 | Japan . |
| 862018 | 3/1961 | United Kingdom . |
| 1191872 | 5/1970 | United Kingdom . |
| 2 188 311 | 9/1987 | United Kingdom . |
| WO 91/02034 | 2/1991 | WIPO . |
| WO 91/15425 | 10/1991 | WIPO . |
| WO 92/13983 | 8/1992 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Werner Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

*Primary Examiner*—Helene Klemanski

[57] ABSTRACT

A modified carbon product is described which comprises carbon having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the carbon and the organic group is present at a level of from about 0.10 to about 2.7 micromoles/m$^2$ of the carbon used based on CTAB or t-area of the carbon or in an amount such that the modified carbon product has a residue value of more than about 5 wt %. Also described are aqueous and non-aqueous inks and coatings containing the modified carbon product. A method to increase the flow of an ink, as measured by glass plate flow, by incorporating the modified carbon product as part of the ink is also disclosed. Lastly, non-aqueous ink and coating formulations are described which contain an appropriate solvent and a modified carbon product comprising carbon having attached at least one organic group, wherein the organic group comprises a) at least one aromatic group or $C_1$–$C_{12}$ alkyl group, and b) at least one ionic group, at least one ionizable group, or a mixture of an ionic group and an ionizable group, wherein the organic group is present in any amount.

43 Claims, No Drawings

U.S. PATENT DOCUMENTS

| | | | |
|---|---|---|---|
| 3,025,259 | 3/1962 | Watson et al. | 106/476 |
| 3,317,458 | 5/1967 | Clas et al. | 260/41.5 |
| 3,335,020 | 8/1967 | Aboytes et al. | 106/476 |
| 3,423,391 | 1/1969 | Kindler et al. | 260/141 |
| 3,528,840 | 9/1970 | Aboytes | 106/473 |
| 3,671,476 | 6/1972 | Terai et al. | 260/23 |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,265,768 | 5/1981 | Beasley et al. | 210/682 |
| 4,320,011 | 3/1982 | Sato et al. | 210/694 |
| 4,366,139 | 12/1982 | Kühner et al. | 423/449 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,597,794 | 7/1986 | Ohta et al. | 106/20 C |
| 4,820,751 | 4/1989 | Takeshita et al. | 523/215 |
| 4,831,011 | 5/1989 | Oikawa et al. | 502/406 |
| 5,130,363 | 7/1992 | Scholl et al. | 524/392 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,281,261 | 1/1994 | Lin | 106/20 R |
| 5,282,887 | 2/1994 | Gay et al. | 106/261 |
| 5,401,313 | 3/1995 | Supplee et al. | 106/475 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |

MODIFIED CARBON PRODUCTS AND INKS AND COATINGS CONTAINING MODIFIED CARBON PRODUCTS

This application is a continuation-in-part of U.S. patent application Ser. No. 08/663,707, filed Jun. 14, 1996, now U.S. Pat. No. 5,707,432 which is incorporated in its entirety by reference herein.

BACKGROUND OF THE INVENTION

1. Field of the Invention

This invention relates to modified carbon products and inks and coatings which contain modified carbon products.

2. Discussion of the Related Art

Presently, predominant black pigments are carbon blacks such as furnace blacks which can be used as colorants either in dry, powdered form, a flushed paste, or liquid concentrate form. Generally, the form of the colorant influences the hue, permanency, bulk, opacity, gloss, rheology, end use, and print quality.

There are various classifications of inks used presently. These categories include printing inks, ultraviolet cure inks, ball-point inks, and stamp pad or marking inks. Generally, inks can be applied by letter press, lithographic, flexographic, gravure, silk screen, stencil, duplicating, and electrostatic. Inks thus can be found in such end uses as news, publication, commercial, folding carton, book, corrugated box, paper bag, wrapper, label, metal container, plastic container, plastic film, foil, laminating, food insert, sanitary paper, textile and the like. McGraw-Hill's *Encyclopedia of Science and Technology*, Vol. 7, pgs. 159–164, provides further details of the types of inks available and their uses, all of which is incorporated herein by reference.

Coatings can contain pigments as well and are used for decorative, protective, and functional treatments of many kinds of surfaces. These surfaces include, coils, metals, appliances, furniture, hardboard, lumber and plywood, marine, maintenance, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on waveguide fibers for signal transmission, and magnetic coatings on video tapes and computer disks are among many so-called hi-tech applications for coatings.

Categories of aqueous vehicles for aqueous inks and coatings include those in which the binder is soluble in water, those in which it is colloidally dispersed, and those in which it is emulsified to form a latex. The combination of binder and volatile liquid is called the vehicle which may be a solution or a dispersion of fine binder particles in a non-solvent. Pigments are finely divided, insoluble, solid particles dispersed in the coating vehicle and distributed throughout the binder in the final film. Surfactants can be used as pigment dispersants. The components and manufacturing of aqueous coatings are further discussed in the *Concised Encyclopedia of Polymers, Science and Engineering*, pgs. 160–171 (1990), which is incorporated herein by reference.

Non-aqueous inks and coatings are used for many applications in which aqueous vehicles are not suitable. For instance, inks which are to be printed on hydrophobic, non-porous substrates such as metal, glass, or plastics must be fast-drying. Therefore, solvents such as ketones, esters, alcohols, or hydrocarbons are often used instead of water. Such solvent-based inks are used widely for industrial labeling of cardboard boxes and various metal or plastic containers and components. Specific examples include news ink compositions and web off-set gloss heat-set ink compositions.

Inks and coatings are also required to be water resistant in certain situations. In such instances, water-resistant resins can be dissolved in non-aqueous solvents of ink and coating formulations to provide the desired water resistance upon drying. A primary use of such non-aqueous coatings is on metal and plastic automotive parts.

SUMMARY OF THE INVENTION

The present invention relates to a modified carbon product comprising carbon having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group is directly attached to the carbon and the organic group is present at a level of from about 0.10 to about 2.7 micromoles/m$^2$ or in an amount such that the modified carbon product is not readily dispersible in water as that term is defined in this application.

The present invention also relates to a coating or ink composition, aqueous or non-aqueous, comprising the above-described modified carbon product.

The present invention further relates to a non-aqueous coating or ink composition comprising a modified carbon product and a non-aqueous solvent. The modified carbon product comprises carbon having attached at least one organic group wherein the organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group is directly attached to the carbon and there is no limit on the amount of organic group that can be present.

Carbon, as used herein, may be of the crystalline or amorphous type. Examples include, but are not limited to, graphite, carbon black, carbon fiber, vitreous carbon, and activated charcoal or activated carbon. Finely divided forms of the above are preferred; also, it is possible to utilize mixtures of different carbons.

DESCRIPTION OF THE PREFERRED EMBODIMENTS

The modified carbon product of the present invention comprises carbon having attached thereto at least one organic group. This organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the carbon. Further, the organic group is present at a level of from about 0.10 to about 2.7 micromoles/m$^2$ or in an amount such that the modified carbon product is not readily dispersible in water as that term is defined in this application.

The carbon may be of the crystalline or amorphous type. Examples include, but are not limited to, graphite, carbon black, vitreous carbon, activated charcoal, carbon fiber, activated carbon, and mixtures thereof. Finely divided forms of the above are preferred; also, it is possible to utilize mixtures of different carbons.

The modified carbon products may be prepared preferably by reacting carbon with a diazonium salt in a liquid reaction medium to attach at least one organic group to the surface of the carbon. The diazonium salt may contain the organic group to be attached to the carbon. A diazonium salt is an organic compound having one or more diazonium groups. Preferred reaction media include water, any medium containing water, and any medium containing alcohol. Water is the most preferred medium. Examples of modified carbon products, wherein the carbon is carbon black, and various preferred methods for their preparation are described in U.S. patent application Ser. No. 08/356,660 entitled "Reaction of Carbon Black with Diazonium Salts, Resultant Carbon Black Products and Their Uses," filed Dec. 15, 1994 and its continuation-in-part application, U.S. patent application Ser. No. 08/572,525, filed Dec. 14, 1995, both of which are incorporated herein by reference. Examples of modified carbon products, wherein the carbon is not carbon black, and various preferred methods for their preparation are described in U.S. Pat. No. 5,554,739 entitled "Reaction of Carbon Materials With Diazonium Salts and Resultant Carbon Products," WO 96/18696 and WO 96/18688, all incorporated herein by reference.

In the preferred preparation of the above modified carbon products, the diazonium salt need only be sufficiently stable to allow reaction with the carbon. Thus, that reaction can be carried out with some diazonium salts otherwise considered to be unstable and subject to decomposition. Some decomposition processes may compete with the reaction between the carbon and the diazonium salt and may reduce the total number of organic groups attached to the carbon. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be prepared in situ. It is preferred that the modified carbon products of the present invention contain no by-products or unattached salts.

In the preferred process of preparation, carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology. Other carbons can be similarly reacted with the diazonium salt. In addition, when modified carbon products utilizing carbon other than carbon black are, for instance, used in non-aqueous inks and coatings, the carbon should preferably be ground to a fine particle size before reaction with the diazonium salt in the preferred process to prevent unwanted precipitation of the modified carbon product in the inks and coatings. In addition, when modified carbon products utilizing carbon other than carbon black are used in ink jet inks, the carbon should preferably be ground to a fine particle size before reaction with the diazonium salt in the preferred process to prevent unwanted precipitation in the ink. An additional means of stabilization of the particles may be necessary in ink jet inks when using low amounts of organic groups on the carbon. One such means can be the use of a polymeric dispersant.

For purposes of one embodiment of the present invention, the amount of organic group attached to the carbon is important for purposes of the subsequent use of the modified carbon product in such applications as coating formulations and ink systems. In particular, the levels should be of a low level. In other words, the levels of organic group may be from about 0.10 to about 2.7 micromoles/m$^2$ of the carbon used, preferably from about 0.4 to about 2.5 micromoles/m$^2$ based on CTAB or t-area of the carbon. Another way to characterize the low level of organic groups attached to the carbon to form the modified carbon product would be to measure the residue of the modified carbon product. In particular, these residue values are measured by first adding the modified carbon to an aqueous solution such as water and then passing this aqueous solution containing the modified carbon through a screen having a 325 mesh and then washing with water until the filtrate is colorless. The pH of the water may be adjusted to enhance ionization of the groups on the carbon. The modified carbon that does not pass through the screen is weighed. The weight percentage of the amount that does not pass through the screen is the residue value. For purposes of the present invention, a modified carbon having a residue value of more than about 5 wt % would not be considered to be "readily dispersible in water."

It was commonly believed that the higher the amount of organic group attached to the carbon, the better the properties. However, in certain situations, attaching low levels of organic groups to carbon results in better properties. These better properties have been seen, for instance, with the use of the modified carbon products of the present invention in non-aqueous applications such as non-aqueous ink systems including non-aqueous gloss ink system and non-aqueous coating formulations. When the modified carbon products of the present invention have been used in these systems and formulations, improved jetness, blue undertone, and gloss have been achieved and in certain situations, the rheology of the ink, as measured by the Laray viscosity, spreadometer values, and vertical glass plate flow properties have been modified. In some ink formulations, flow was increased considerably over that of untreated carbon products.

As stated earlier, the organic group comprises an aromatic group or a $C_1$–$C_{12}$ alkyl group. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like). The $C_1$–$C_{12}$ alkyl group may be branched or unbranched and is preferably ethyl.

An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, can include groups derived from organic acids. Preferably, when the organic group contains an ionizable group forming an anion, the organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$, —$SO_2NHCOR$, and their salts, for example —COONa, —COOK, —COO—$NR_4^+$, —$SO_3Na$, —$HPO_3Na$, —$SO_3^-NR_4^+$, and $PO_3Na_2$, where R is a saturated or unsaturated alkyl or phenyl group. Particularly preferred ionizable substituents are —COOH and —$SO_3H$ and their sodium and potassium salts.

Accordingly, it is preferred that the carbon is treated with aryl diazonium salts containing at least one acidic functional group. Examples of aryl diazonium salts include, but are not limited to, those prepared from sulfanilic acid, 4-aminobenzoic acid, 4-amino salicylic acid, 7-amino-4-hydroxy-2-naphthlenesulfonic acid, aminophenylboronic acid, aminophenylphosphonic acid, and metanilic acid.

The organic group can be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. One example of a sulfophenyl group is hydroxysulfophenyl group or a salt thereof.

Specific organic groups having an ionizable functional group forming an anion are p-sulfophenyl and 4-hydroxy-3-sulfophenyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—$NR_3^+$) and quaternary phosphonium groups (—$PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. Quaternized cyclic amines, and quaternized aromatic amines, can also be used as the organic group. Thus, N-substituted pyridinium compounds, such as N-methyl-pyridyl, can be used in this regard. Examples of organic groups include, but are not limited to, 3-$C_5H_4N(C_2H_5)$ $^+X^-$, $C_6H_4NC_5H_5^+X^-$, $C_6H_4COCH_2N(CH_3)_3^+X^-$, $C_6H_4COCH_2(NC_5H_5)$ $^+X^-$, 3-$C_5H_4N$ $(CH_3)$ $^{30}X^-$, $C_6H_4N(CH_3)_3^+X^-$, and $C_6H_4CH_2N(CH_3)_3^+X^-$, wherein $X^-$ is a halide or an anion derived from a mineral or organic acid.

Additional optional functional groups which may be present on the organic group include, but are not limited to, R, OR, COR, COOR, OCOR, halogen, CN, $NR_2$, $SO_2NR(COR)$, $SO_2NR_2$, NR(COR), $CONR_2$, $NO_2$, $SO_3M$, $SO_3NR_4$, and N=NR'. R is independently hydrogen, $C_1$–$C_{20}$ substituted or unsubstituted alkyl (branched or unbranched), $C_3$–$C_{20}$ substituted or unsubstituted alkenyl, ($C_2$–$C_4$ alkyleneoxy)$_x$R", or a substituted or unsubstituted aryl. R' is independently hydrogen, $C_1$–$C_{20}$ substituted or unsubstituted alkyl (branched or unbranched), or a substituted or unsubstituted aryl. R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl. M is H, Li, Na, Cs, or K. The integer x ranges from 1–40 and preferably from 2–25.

Another example of an organic group is an aromatic group of the formula $A_yAr$-, which corresponds to a primary amine of the formula $A_yArNH_2$. In this formula, the variables have the following meanings: Ar is an aromatic radical selected from the group consisting of phenyl, naphthyl, anthracenyl, phenanthrenyl, biphenyl, pyridinyl, and triazinyl; A is a substituent on the aromatic radical independently selected from a functional group described above or A is a linear, branched or cyclic hydrocarbon radical (preferably containing 1 to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl. When A is a ($C_2$–$C_4$ alkyleneoxy)$_x$R" group, it is preferably a polyethoxylate group, a polypropoxylate group, or a random or block mixture of the two.

Another example of a modified carbon product comprises carbon and an attached organic group having a) an aromatic group or a $C_1$–$C_{12}$ alkyl group and b) at least one group of the formula $SO_2NR_2$ or $SO_2NR(COR)$. R is independently hydrogen, a $C_1$–$C_{20}$ substituted or unsubstituted alkyl, a $C_3$–$C_{20}$ substituted or unsubstituted alkenyl, ($C_2$–$C_4$ alkyleneoxy)$_x$R' or a substituted or unsubstituted aryl; R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or substituted or unsubstituted aroyl; and x is from 1 to 40. Aromatic groups include p-$C_6H_4SO_2NH_2$, p-$C_6H_4SO_2NHC_6H_{13}$, p-$C_6H_4SO_2NHCOC_5H_{11}$ and p-$C_6H_4SO_2NHCOC_6H_5$.

As stated earlier, the modified carbon products above are useful in non-aqueous ink formulations. Thus, the invention provides an improved ink composition containing a suitable solvent and a modified carbon product having attached an organic group comprising a) a substituted or unsubstituted aromatic group or a $C_1$–$C_{12}$ alkyl group and b) at least one ionic group, at least one ionizable group or a mixture of an ionic group and an ionizable group. Other known ink additives may be incorporated into the ink formulation. It is also within the bounds of the present invention to use an ink formulation containing a mixture of unmodified carbon with the modified carbon products.

In general, an ink includes a colorant or pigment and solvents to adjust viscosity and drying. An ink may optionally further include a vehicle or varnish which functions as a carrier during printing and/or additives to improve printability, drying, and the like. For a general discussion on the properties, preparation and uses of inks, see *The Printing Manual*, 5th Ed., R. H. Leach, et al, Eds. (Chapman & Hall, 1993).

The modified carbon products of the invention can be incorporated into an ink formulation using standard techniques either as a predispersion or as a solid. Use of the modified carbon products of the present invention may provide a significant advantage and cost savings by reducing the viscosity of the formulation. This may also allow higher loading of carbon product in a formulation. The milling time may be reduced as well. The modified carbon products of the present invention may also provide improved jetness, blue tone, and gloss.

The modified carbon products above may also be used in non-aqueous coating compositions such as paints or finishes. Thus, an embodiment of the present invention is a coating composition containing a suitable solvent and the modified carbon product of the present invention. Other conventional coating additives may be incorporated into the non-aqueous coating compositions such as a binder.

Non-aqueous coating formulations vary widely depending on the conditions and requirements of final use. In general, coating systems contain up to 30% by weight carbon. The resin content can vary widely up to nearly 100%. Examples include acrylic, alkyd, urethane, epoxy, cellulosics, and the like. Solvent content may vary between 0 and 80%. Examples include aromatic hydrocarbons, aliphatic hydrocarbons, alcohols, polyalcohols, ketones, esters, and the like. Two other general classes of additives are fillers and modifiers. Examples of fillers are other coloring pigments (e.g., $TiO_2$, phthalo blue and the like), clays, talcs, silicas, and carbonates. Fillers can be added up to 60% depending on final use requirements. Examples of modifiers are flow and leveling aids and biocides generally added at less than 5%. The modified carbon products of the present invention can be incorporated into a non-aqueous coating composition using standard techniques either as a predispersion or as a solid.

Examples of non-aqueous media for the incorporation of compositions containing the modified carbon products of the present invention include, but are not limited to, melamine-acrylic resins, melamine-alkyd resins, urethane-hardened alkyd resins, urethane-hardened acrylic resins, and the like. The modified carbon products of the present invention may also be used in aqueous emulsion paints. In these types of paints, there is a non-aqueous portion containing the pigment wherein the non-aqueous portion is then dispersed in the aqueous paint. Accordingly, the modified carbon products of the present invention can be used as part of the non-aqueous portions which is then dispersed into the aqueous emulsion paints.

The modified carbon products of the present invention are also useful in aqueous ink and coating formulations. Aqueous includes mixtures of water and other water-miscible or -dispersible substances, such as an alcohol. Thus, the invention provides an aqueous ink composition comprising water and a modified carbon product according to the invention. Other known aqueous ink additives may be incorporated into the aqueous ink formulation. As stated previously, an ink may consist of the various components described above. Various aqueous ink compositions are also disclosed, for example, in U.S. Pat. Nos. 2,833,736; 3,607,813; 4,104,833; 4,308,061; 4,770,706; and 5,026,755, all incorporated herein by reference.

The modified carbon products of the present invention, either as a predispersion or as a solid, can be incorporated into an aqueous ink formulation using standard techniques.

Flexographic inks represent a group of aqueous ink compositions. Flexographic inks generally include a colorant, a binder, and a solvent. The modified carbon products of the invention may be useful as flexographic ink colorants. The modified carbon products of the invention may be used in aqueous news inks. For example, an aqueous news ink composition may comprise water, the modified carbon products of the invention, a resin and conventional additives such as antifoam additives or a surfactant.

The modified carbon products of this invention may also be used in aqueous coating compositions such as paints or finishes. Thus, an embodiment of the invention is an improved aqueous coating composition comprising water, resin and a modified carbon product according to the invention. Other known aqueous coating additives may be incorporated the aqueous coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference. The aqueous compositions of the present invention may also comprise additional other coloring pigments (e.g. $TiO_2$, phthalo blue and the like), clays, talc, silicas, and carbonates. The modified carbon products of the invention, either as a predispersion or as a solid, can be incorporated into an aqueous coating composition using standard techniques.

An an ink or coating may be used for a variety of applications. Preferably, in aqueous inks and coatings of the present invention, the modified carbon products are present in an amount of less than or equal to 20% by weight of the ink or coating. It is also within the bounds of the present invention to use an aqueous or non-aqueous ink or coating formulation containing a mixture of unmodified carbon with the modified carbon products of the present invention. Common additives such as those discussed below may be added to the dispersion to further improve the properties of the aqueous ink or coating.

Also, the modified carbon products of the present invention can be used in ink jet inks where the ink formulation may be based on solvents, aqueous, or an aqueous emulsion.

Lastly, the present invention also relates to other non-aqueous ink and coating formulations. In these formulations, an appropriate solvent is present along with a modified carbon product of the present invention. For these formulations, the modified carbon product comprises carbon having attached at least one organic group wherein the organic group comprises a) at least one aromatic group or a $C_1$–$C_{12}$ alkyl group, and b) at least one ionic group, at least one ionizable group, or a mixture of an ionic group and an ionizable group. The aromatic group is directly attached to the carbon and there are no limits on the amount of organic group present on the carbon. The various additional ingredients described above with respect to the non-aqueous ink and coating formulations applies equally here as well as the amounts of the various components except for the amount of organic group on the carbon wherein there is no upper or lower limit. The above discussion regarding the organic groups and examples thereof apply equally here.

The following examples are intended to illustrate, not limit, the claimed invention.

BET Nitrogen surface areas were obtained using ASTM D-4820. CTAB area meare obtained using ASTM D-2414. Optical properties of the ink and coating films were determined with the following instruments: L*a*b* values with a Hunter Lab Scan 6000 at 10 degree D65 CIELAB color space instrument; optical density was measured with a MacBeth RD918 densitometer; gloss was measured with a BYK Gardner model 4527 glossmeter.

The nitrogen and external surface area (t-area) was measured following the sample preparation and measurement procedure described in ASTM D-3037. For this measurement the nitrogen adsorption isotherm is extended up to 0.55 relative pressure. The relative pressure is the pressure (P) divided by the saturation pressure (P0, the pressure at which the nitrogen condenses). The adsorption layer thickness (t in angstroms) was calculated using the relation:

$$t=0.88(p/P0)^2+6.45(P/P0)+2.98.$$

The volume (v) of nitrogen adsorbed was then plotted against $t_1$, and a straight line was then fitted through the data points for t values between 3.9 and 6.2 angstroms. The t-area was then obtained from the slope of this line as follows:

$$\text{t-area, m}^2/\text{g}=15.47\times\text{slope}.$$

Sulfur contents on the carbon black product were determined by combustion analysis after Soxhlet washing of each sample. The mmol sulfur attached was determined by difference from the assay of the untreated carbon black.

EXAMPLE 1

Preparation of a Carbon Black Product with a Diazonium Salt Generated in situ Sulfanilic acid (3.0 g) was added to 900 mL deionized water and the mixture heated to 70°–90° C. To this solution was added a carbon black with a CTAB surface area of 350 $m^2/g$, t-area of 366 $m^2/g$, and a DBPA of 120 mL/100 g (100 g). This mixture was stirred well to wet out all of the carbon black. A solution of 1.2 g sodium nitrite in 1.0 mL deionized water was added to the carbon black slurry. Gas was evolved within several minutes. Heating of the mixture was suspended and the mixture allowed to cool to ambient temperature with continued stirring. The product was isolated by evaporation of the solution in an oven at 70°–100° C. The product had attached p-$C_6H_4$—$SO_3Na$ groups.

Alternatively, the product could be isolated by filtration of the slurry in a Buchner funnel and washing the solids with deionized water.

EXAMPLE 2

Preparation of Carbon Black Products having different amounts of attached groups The procedure of Example 1 was repeated with a carbon black with a CTAB surface area of 350 $m^2/g$, t-area of 366 $m^2/g$, and a DBPA of 120 mL/100 g using the amounts of reagents listed in the table below:

| Example | Sulfanilic Acid (g) | g $NaNO_2$/g $H_2O$ | Carbon Black (g) |
| --- | --- | --- | --- |
| 2a | 7.0 | 2.8/3 | 100 |
| 2b | 15.0 | 6.0/6 | 100 |

EXAMPLE 3

Preparation of a Carbon Black Product Using a Pin Pelletizer

An eight inch diameter pin pelletizer was charged with 300 g of a carbon black with a CTAB surface area of 350 $m^2/g$, t-area of 366 $m^2/g$, and a DBPA of 120 mL/100 g and 15 g sulfanilic acid. The pelletizer was run at 150 rpm for 1 minute. A solution of deionized water (280 mL) and sodium nitrite (5.98 g) were added and the pelletizer was run for 2 minutes at 250 rpm. The pelletizer was stopped and the shaft and pins were scraped off, then the pelletizer was run at 650 rpm for an additional 3 minutes. The 4-sulfobenzenediazonium hydroxide inner salt was generated in situ, and it reacted with the carbon black. The product was discharged from the pelletizer and dried in an oven at 70°–100° C. The product had attached p-$C_6H_4$—$SO_3Na$ groups. Analysis of a Soxhlet extracted sample for sulfur content indicated that this product had 0.15 mequiv./g attached sulfonate groups, or 0.43 micromoles/$m^2$ of attached sulfonate groups.

EXAMPLE 4

Preparation of a Carbon Black Product

A solution of the diazonium salt of 4-aminosalicylic acid was prepared as follows. To 550 mL deionized water was added 57.4 g of 4-aminosalicylic acid. The mixture was cooled in an ice bath and 93.75 mL concentrated hydrochloric acid was added. To this cold mixture was added a solution of 25.9 g sodium nitrite in 50 mL deionized water. The mixture darkened in color and some gas was released. This solution was calculated to contain 0.038 g of the diazonium of 4-aminosalicylic acid/g solution.

To a well stirred slurry of a carbon black with a CTAB surface area of 350 $m^2/g$ and a DBPA of 120 mL/100 g (200 g) in 1.8 L deionized water cooled in an ice bath was added 233.2 g of the 4-aminosalicylic diazonium solution. Gas was evolved. Stirring was continued until no further gas evolution was observed. The slurry was vacuum filtered and washed with deionized water. The wet cake was dried in an oven at 75° C. The product had attached p-$C_6H_3$-(2-OH)—COOH groups.

EXAMPLE 5

Preparation of a Carbon Black Product

To a well stirred slurry of a carbon black with a CTAB surface area of 350 $m^2/g$ and a DBPA of 120 mL/100 g (200 g) in 1.8 L deionized water cooled in an ice bath was added 1168 g of the 4-aminosalicylic diazonium solution as prepared in Example 4. Gas was evolved. Stirring was continued until no further gas evolution was observed. The slurry was vacuum filtered and washed with deionized water. The wet cake was dried in an oven at 75° C. The product had attached p-$C_6H_3$-(2-OH)—COOH groups.

EXAMPLE 6

Preparation of a Carbon Black Product

A solution of the diazonium salt of 4-amninobenzoic acid was prepared as follows. To 925 mL deionized water was added 89.1 g of 4-aminobenzoic acid. The mixture was cooled in an ice bath and 162.5 mL concentrated hydrochloric acid was added. Acetone (50 mL) was added to completely dissolve the 4-aminobenzoic acid. To this cold mixture was added a solution of 44.9 g sodium nitrite in 100 mL deionized water. The mixture darkened in color and some gas was released. This solution was calculated to contain 0.061 g of the diazonium of 4-aminobenzoic acid/g solution.

To a well stirred slurry of a carbon black with a CTAB surface area of 350 $m^2/g$ and a DBPA of 120 mL/100 g (200 g) in 1.8 L deionized water cooled in an ice bath was added 131 g of the 4-aminobenzoic diazonium solution. Gas was evolved. Stirring was continued until no further gas evolution was observed. The slurry was vacuum filtered and washed with deionized water. The wet cake was dried in an oven at 75° C. The product had attached p-$C_6H_4$—COOH groups. The product had a 325 mesh residue of 90%.

EXAMPLE 7

Preparation of Carbon Black Products having different amounts of attached groups Using the Diazonium solution prepared in Example 6, a carbon black with a CTAB surface area of 350 $m^2/g$ and a DBPA of 120 mL/100 g was functionalized with various amounts of the phenyl carboxylate group. The amounts used are presented in the table below. The procedure used was analogous to Example 6.

| Example | Amount of Diazonium Solution | Amount of Carbon Black | 325 Mesh Residue |
|---|---|---|---|
| 7a | 263 g | 200 g | 63.7% |
| 7b | 394 g | 200 g | 3.9% |
| 7c | 656 g | 200 g | 4.0% |

EXAMPLE 8

Preparation of a Carbon Black Product in a Pin Pelletizer

This process was analogous to Example 3 using 300 g of a carbon black with a CTAB surface area of 350 m$^2$/g and a DBPA of 120 mL/100 g and 24 g of 4-aminobenzoic acid. The pelletizer was run at 500 rpm for 1 minute. A solution of deionized water (300 mL) and sodium nitrite (12.1 g) were added and the pelletizer was run for 2–3 minutes at 1100 rpm. The product was discharged from the pelletizer and dried in an oven at 70°–100° C. The product had attached p-C$_6$H$_4$—COONa groups.

EXAMPLE 9

Preparation of a Carbon Black Product

This represents an alternative method for producing a product like that of Example 6. The product of Example 8 (150 g) was slurried in 500 mL deionized water. To this slurry was added 21.9 mL concentrated hydrochloric acid. After stirring 30 minutes, the slurry was filtered and washed with deionized water, and the wet cake was dried at 75° C. The product had attached p-C$_6$H$_4$—COOH groups.

EXAMPLE 10

Preparation of a Carbon Black Product

This procedure is analogous to Example 1, except an oxidized carbon black with a nitrogen surface area of 560 m$^2$/g, a DBPA of 90 mL/100 g, and a volatile content of 9.5% was used. Amounts of reagents used for each treatment level are shown in the table below. Carbon black was a 10% slurry in deionized water.

| Example | Sulfanilic Acid (g) | g NaNO$_2$/g H$_2$O | Carbon Black (g) | mmol S attached/g Product |
|---|---|---|---|---|
| 10a | 6.0 | 2.4/3 | 200 | 0.162 |
| 10b | 10.0 | 4.0/5 | 200 | 0.237 |
| 10c | 20.0 | 8.0/8 | 200 | 0.496 |
| 10d | 30.0 | 12.0/12 | 200 | 0.670 |
| 10e | 50.0 | 19.9/20 | 200 | 1.00 |

EXAMPLE 11

Preparation of a Carbon Black Product

The procedure of Example 3 was used where the carbon black had a t-area of 93 m$^2$/g and a DBPA of 55 mL/100 g. The amount of reagents used are shown in the table below.

| Carbon from Example # | Carbon Black (g) | Sulfanilic Acid (g) | NaNO$_2$ (g) | Deionized Water (mL) | mmol S attached/g Product | $\mu$mol S attached/m$^2$ Product |
|---|---|---|---|---|---|---|
| 11a | 400 | 0 | 0 | 215 | 0 | 0 |
| 11b | 400 | 4 | 1.6 | 215 | 0.041 | 0.44 |
| 11c | 400 | 8 | 3.2 | 215 | 0.084 | 0.90 |
| 11d | 400 | 20 | 8.0 | 215 | 0.193 | 2.08 |

These products have attached p-C$_6$H$_4$—SO$_3$Na groups. Samples of each were Soxhlet extracted (ethanol) and analyzed for sulfur content. Results are shown in the table along with the corresponding amount of attachment/m$^2$.

The pellets produced from this process were ground in an 8-inch jet mill (Sturtevant, Boston, Mass.) to convert the pellets to a "fluffy" type product. This process is described in *Perry's Chemical Engineers' Handbook*." 6th Ed., R. H. Perry and D. Green, Eds., pp. 8–46. These ground materials were used in Example 18.

EXAMPLE 12

Preparation of a Carbon Black Product

This procedure describes the preparation of a carbon black product under continuous operating conditions. 100 parts per hour of a carbon black having a CTAB surface area of 350 m$^2$/g and a DBPA of 120 mL/100 g was charged to a continuously operating pin mixer with 25 parts per hour of sulfanilic acid and 10 parts per hour of sodium nitrite as an aqueous solution. The resultant material was dried to give a carbon black product having attached p-C$_6$H$_4$SO$_3$Na groups. Analysis of a Soxhlet extracted (ethanol) sample for sulfur content indicated that the product had 0.95 mequiv./g attached sulfonate groups, or 2.7 micromoles/m$^2$ attached sulfonate groups.

EXAMPLE 13

Use of Carbon Black Products in Coating Compositions

This example illustrates the use of carbon black products in thermoset acrylic compositions. The standard was a carbon black with a CTAB surface area of 350 m$^2$/g and a DBPA of 120 mL/100 g without any additional treatments. The materials evaluated here were prepared in Examples 1, 2a, 2b, and 12.

The coating compositions were prepared as follows. To each one half gallon steel ball mill were charged: 2.1 kg ¼" steel balls, 3.3 kg ½" steel balls, 282 g grind masterbatch (64 parts ACRYLOID AT400 resin, 30 parts n-butanol, 6 parts methyl-n-amyl ketone), and 30 g carbon black. The mill jars were turned at 44 rpm on a jar rolling mill operating at 82 rpm (Paul O. Abbe model 96806 or equivalent) for the time indicated. The finished coating formulation was prepared by first reducing each mill with 249 g AT-400 resin and turning for one hour on the jar mill. A second reduction was done by adding 304 g of a mixture of 33 parts AT-400 resin, 35.3 parts CYMEL 303 melamine-formaldehyde resin, 7.2 parts methyl-n-amyl ketone, 8.5 parts 2-ethoxyethyl acetate (Cellosolve acetate-Union Carhide), 1.8 parts CYCAT 4040 (an acid catalyst of toluenesulfonic acid and isopropanol), 0.3 parts FLUORAD FC431 additive, 14 parts n-butanol, and rolling for one hour.

ACRYLOID is a registered trademark for resins available from Rohm and Haas, Philadelphia, Pa.; CYMEL and CYCAT are registered trademarks for products available from Cytec Industries, West Patterson, N.J.; and FLUORAD is a registered trademark for additives available from 3M, St. Paul, Minn.

The optical properties were determined on a 3 mil film on a sealed Leneta chart that had been air dried for 30 minutes and then baked at 250° C. for 30 minutes. A Hunter Color Meter was used to measure L*, a*, and b* values. Optical density was measured with a MacBeth RD918 densitometer. Gloss was measured with a BYK Gardner model 4527 glossmeter. Viscosity was measured in Krebs Units on a Brookfield KU-1 viscometer.

Thermoset acrylic formulations were prepared according to the general method described by grinding in a ball mill for 27 hours. Draw downs, 3 mil thick, were prepared and their optical properties were evaluated. The results are summarized in the following table:

| Carbon from Example # | Optical Density | L* | a* | b* | Gloss (60°) | Viscosity |
|---|---|---|---|---|---|---|
| Standard | 2.76 | 1.55 | 0.02 | 0.02 | 89.9 | 107 |
| 1 | 2.81 | 1.29 | −0.05 | −0.12 | 92.0 | 105 |
| 2a | 2.75 | 1.44 | 0.03 | −0.06 | 90.0 | 98 |
| 2b | 2.71 | 1.46 | −0.06 | 0.15 | 87.5 | 91 |
| 12 | 2.77 | 1.40 | 0.02 | 0.12 | 81.3 | 82 |

There is a drop in formulation viscosity as treatment level is increased. All optical properties peak at the lower levels; the coating produced using the carbon black product from Example 1, treated with 3 wt % sulfanilic acid diazonium salt is more optically dense, jetter, bluer, and glossier than all the other materials. These samples are weight compensated for the treatment, i.e., the same weight of carbon black in each formulation.

EXAMPLE 14

Carbon Black Products Functionalized with Various Levels of Salicyclic Acid Used in a Thermoset Acrylic Formulation Carbon black products prepared in Examples 4 and 5 were evaluated in a thermoset acrylic formulation according to general method in Example 13 after grinding for 18 and 42 hours. The results are summarized in the table below. In this example, equal weights of carbon black product were used in each formulation. The standard was carbon black with a CTAB surface area of 350 m²/g and a DBPA of 120 mL/100 g without any additional treatments.

| Carbon From Example # | Grinding Time (h) | Optical Density | L* | a* | b* | Gloss (60°) | Viscosity |
|---|---|---|---|---|---|---|---|
| Standard | 18 | 2.82 | 1.35 | −0.15 | 0.03 | 93.0 | 93 |
| Standard | 42 | 2.82 | 1.24 | −0.07 | −0.27 | 91.2 | 101 |
| 4 | 18 | 2.87 | 1.16 | −0.14 | −0.16 | 93.7 | 97 |
| 4 | 42 | 2.94 | 1.02 | −0.04 | −0.41 | 92.8 | 103 |
| 5 | 18 | 2.85 | 1.25 | −0.16 | −0.18 | 92.2 | 94 |
| 5 | 42 | 2.86 | 1.10 | 0.03 | −0.36 | 92.5 | 98 |

At each grinding time the material with the lower treatment, Example 4, shows greater optical density, jetness (L*), deeper bluetone, and more gloss than either the untreated standard or the more highly treated material (from Example 5).

EXAMPLE 15

Carbon Black Product Treated with Various Levels of 4-Aminobenzoic Acid Used in a Thermoset Acrylic Formulation Carbon black products prepared according to Examples 6, 7a, and 7b were evaluated in a thermoset acrylic formulation, as described in Example 13. The optical properties of a coating prepared after 27 hours of grinding are shown in the Table below. Each formulation contained 30 g of the carbon black product. The standard was carbon black with a CTAB surface area of 350 m²/g and a DBPA of 120 mL/100 g without any additional treatments.

| Carbon from Example # | Optical Density | L* | a* | b* | Gloss (60°) | Viscosity |
|---|---|---|---|---|---|---|
| Standard** | 2.82 | 1.58 | −0.06 | 0.17 | 91.6 | 94 |
| 6 | 3.09 | 0.88 | −0.15 | −0.26 | 91.7 | 100 |
| 7a | 3.19 | 0.75 | −0.04 | −0.22 | 96.5 | 91 |
| 7b | 3.22 | 0.75 | −0.06 | −0.22 | 98.0 | 88 |
| 7c | 3.20 | 0.74 | −0.10 | −0.20 | 98.4 | 85 |

**Sample prepared after 42 hours grinding.

In this example with attached benzoic acid groups, Example 7a, treated with 8 wt % 4-aminobenzoic acid diazonium salt, is sufficient to give improved optical properties over the standard, untreated, carbon black. Higher treatment levels did not improve the coating properties significantly.

EXAMPLE 16

Performance of a Surface Treated Carbon Black Product Further Functionalized with Various Amounts of Sulfanilic Acid Diazonium Salt Carbon Black products prepared in Examples 10a–e (3, 5, 10, 15, 25 wt % sulfanilic acid diazonium, respectively) were evaluated in a thermoset acrylic formulation, as described in Example 13. The optical properties of a coating prepared after 27 hours grinding are shown in the table below. Each formulation contained an equal amount of carbon black product. The standard was a surface treated carbon black with a nitrogen surface area of 560 m²/g, a DBPA of 90 mL/100 g, and a volatile content of 9.5%.

| Carbon from Example # | Optical Density | L* | a* | b* | Gloss (60°) | Viscosity |
|---|---|---|---|---|---|---|
| Standard | 2.68 | 1.74 | −0.07 | 0.11 | 88.8 | 92 |
| 10a | 2.95 | 1.32 | −0.01 | 0.14 | 93.7 | 89 |
| 10b | 2.88 | 1.12 | −0.11 | −0.19 | 86.5 | 98 |
| 10c | 2.84 | 1.21 | −0.08 | −0.10 | 76.9 | 102 |
| 10d | 2.85 | 1.24 | −0.07 | −0.06 | 84.0 | 99 |
| 10e | 2.81 | 1.34 | −0.03 | 0.08 | 90.1 | 97 |

Oxidized carbon black products with attached sulfonate groups have greater optical densities, jetness, and bluer undertone than an untreated standard. Example 10b (5 wt % treatment) was jetter and bluer than the other materials.

EXAMPLE 17

Carbon Black Product Treated With Various Levels of Sulfanilic Acid Used in a Urethane Hardened Acrylic Formulation This example illustrates the use of carbon black products in an acrylic enamel formulation. Carbon black products from Examples 3 and 12 were used in the following composition. The carbon black products were ground in small steel mills (2¹/₁₆" tall×2³/₃₂" diameter) on a paint shaker. Each mill was charged with 200 g ³/₁₆" chrome steel balls, 2.19 g carbon product, and 19.9 g of grind vehicle consisting of an 80/20 mixture of DMR-499 acrylic mixing enamel (PPG Finishes, Strongsville, Ohio) and xylene. This mixture was ground for 50 minutes. Samples were evaluated on a Hegman gauge. The final formulation was made by adding 23.3 g DMR-499, 17.3 g xylene and 1.4 g DXR-80 urethane hardener (PPG Finishes, Strongsville, Ohio) to the mill and shaking for 15 minutes. A 3 mil drawdown of the completed formulation was made on a sealed Leneta chart. The film was air dried for 30 minutes, then baked at 140° F. for 30 minutes. Optical properties were determined as described in Example 13.

The standard was a carbon black with a CTAB surface area of 350 m²/g and a DBPA of 120 mL/100 g without any additional treatments. Optical properties and Hegman grinds are shown in the table below. Hegman values were measured on a Hegman gauge where 5 "sand" particles are clustered.

| Carbon from Example # | Optical Density | L* | a* | b* | Gloss (60°) | Hegman Grind at 50 min. |
|---|---|---|---|---|---|---|
| Standard | 2.83 | 1.23 | 0.08 | 0.05 | 52.3 | 4.0 |
| 3 | 3.08 | 0.70 | −0.04 | −0.27 | 88.0 | 6.6 |
| 12 | 2.79 | 1.41 | 0.17 | −0.03 | 92.5 | 6.2 |

In this formulation, wetting of the standard product was incomplete, as evidenced by the very low gloss and Hegman gauge readings. The carbon from Example 12 was weight compensated for the amount of treatment on the carbon (2.66 g). The product of Example 3 (5 wt % sulfanilic acid diazonium salt treatment) showed better optical density, jetness, and bluetone values compared to both the standard and the more highly treated materials.

EXAMPLE 18

Evaluation of Carbon Black Products in a Gloss Ink Formulation

The carbon black products of Examples 11a–11d were evaluated in a standard heat set gloss ink formulation prepared on a three roll mill. The performance of 11b–11d was compared to the control sample (Example 11a).

The carbon black samples were prepared for grind on a three roll mill by hand mixing 15 g of carbon black with 35 g of the grind masterbatch. Samples were weight compensated for the amount of treatment applied: 11a, 15.0g; 11b, 15.2g; 11c, 15.3g; 11d, 15.8g. The masterbatch consists of 9 parts LV-3427XL (heatset grinding vehicle, Lawter International, Northbrook, Ill.), to 1 part MAGIESOL 47 oil. This mixture, 50 g, was ground on a Kent three roll mill running at 70° F. Samples were let down by mixing with an equal amount of grind masterbatch and then applied to a NIPRI production grindometer G-2 for evaluation of the grind. The standards were typically passed four times through the mill. Additional passes were made if the grind gauge reading was above 20 microns. The finished ink was produced by mixing the milled material with an equal weight of letdown masterbatch (3 parts LV3427XL, 12 parts LV6025 (heatset gel vehicle, Lawter International), 5 parts MAGIESOL 47 oil) and passing one time through the three roll mill.

MAGIESOL is a registered trademark for oils available from Magie Brothers, Franklin Park, Ill.

Fineness of grind data and viscosity measurements of the resulting inks are shown in the table below. The values in the grind data table are in microns as measured on a G-2 grind gauge and indicate the level where 5 scratches/10 scratches/5 defect grains are detected on the gauge. Steel bar Laray viscosity was measured according to ASTM method D4040-91 at 25° C. using a TMI 95-15-00 Laray viscometer (Testing Machines Inc.), vertical glass plate flow was measured by the distance a 0.5 cc sample of ink travels down a vertical glass plate after the samples are allowed to rest for 0, 30, and 60 minutes prior to standing the plate, and spreadometer properties were measured using a Toyoseiki spreadometer (Testing Machines Inc.) as described in Japanese Industrial Standard, Testing Methods for Lithographic and Letterpress Inks (JIS K5701-4.1.2).

| Properties/Sample | 11a | 11b | 11c | 11d |
|---|---|---|---|---|
| Carbon Black Properties | | | | |
| Ink Preparation | | | | |
| Grinding Base (5 scr/10 scr/sand) | | | | |
| Three roll mill | | | | |
| 1 pass | 6/0/46 | 0/0/27 | 0/0/24 | 0/0/24 |
| 2 passes | 0/0/24 | 0/0/14 | 0/0/22 | 0/0/20 |
| 3 passes | 0/0/20 | 0/0/13 | 0/0/12 | 0/0/17 |
| 4 passes | 0/0/16 | 0/0/8 | 0/0/12 | 0/0/18 |
| Ink Properties | | | | |
| Steel Bar Laray Viscosity | | | | |
| Viscosity (poise at 2500 s⁻¹) | 66.7 | 64.6 | 61.7 | 58.2 |
| Yield Value (dyne/cm at 2.5 s⁻¹) | 507 | 553 | 533 | 490 |
| Vertical Glass Plate Flow (mm) | | | | |
| No Setting | | | | |
| 20 minutes | 85 | 125 | 105 | 115 |
| 40 minutes | 95 | 155 | 132 | 144 |
| 60 minutes | 105 | 175 | 145 | 167 |
| 30 Minutes Setting | | | | |
| 20 minutes | 43 | 98 | 85 | 95 |
| 40 minutes | 56 | 126 | 109 | 119 |
| 60 minutes | 61 | 145 | 126 | 139 |
| 60 Minutes Setting | | | | |
| 20 minutes | 26 | 95 | 79 | 86 |
| 40 minutes | 42 | 125 | 102 | 115 |
| 60 minutes | 48 | 143 | 120 | 135 |
| Spreadometer Properties | | | | |
| Slope (mm) | 18.6 | 9.8 | 9.3 | 9.2 |
| Intercepter (mm) | 23.9 | 23.3 | 24.9 | 25.6 |
| Yield Value (dyne/cm²) | 128.4 | 113.3 | 116.0 | 114.1 |

These data demonstrate how the treatment modifies the rheology of the ink formulation. In these cases, increasing the treatment level reduced the Laray viscosity slightly, but significantly increased the flow (vertical glass plate flow). That the flow remains high after the one hour setting time indicates that this ink composition will flow more consistently over time. This is particularly valuable in offset ink.

The spreadometer slope is also an indication of flowability, but under different shear conditions (higher values correspond to greater flow). The spreadometer intercepter is an indication of the sample's plastic viscosity.

Optical properties for inks made from the carbon black products 11b–11d and the standard carbon black (11a) were determined from prints made using an RNA-42 printability tester (Research North America Inc.) and are shown in the table below. Values for 1.0 and 2.0 micron film thicknesses were calculated from regression of the data from the prints made over a range of film thicknesses.

Optical Properties of a 1 Micron Film Made From Samples 11a–d

| Example | OD | L* | a* | b* | Gloss 60° |
|---|---|---|---|---|---|
| 11a | 1.47 | 19.9 | 1.94 | 5.87 | 45.3 |
| 11b | 1.37 | 23.23 | 1.93 | 6.18 | 45.1 |
| 11c | 1.38 | 23.67 | 1.79 | 5.72 | 42.3 |
| 11d | 1.20 | 31.10 | 1.63 | 5.84 | 38.6 |

Optical Properties of a 2 Micron Film Made From Samples 11a–d

| Example | OD | L* | a* | b* | Gloss 60° |
|---|---|---|---|---|---|
| 11a | 2.28 | 2.93 | 0.68 | 0.75 | 49.1 |
| 11b | 2.24 | 3.16 | 0.94 | 1.33 | 46.8 |
| 11c | 2.08 | 5.41 | 1.53 | 2.67 | 48.1 |
| 11d | 2.10 | 4.30 | 0.95 | 1.39 | 39.7 |

These date indicate that increasing treatment levels diminish the optical properties somewhat. Example 11b combines the improved rheology (for offset ink application) and very good dispersion with a minimum of loss of the optical properties.

EXAMPLE 19

Preparation of a Carbon Black Product The procedure of Example 3 was used where the carbon black had a t-area of 93 m²/g and a DBPA of 55 mL/100 g. The amounts of reagents used are shown in the table below.

| Example # | Carbon Black (g) | para-Aminobenzoic Acid (g) | NaNO₂ (g) | Deionized Water (mL) |
|---|---|---|---|---|
| 19a | 400 | 0 | 0 | 220 |
| 19b | 400 | 4 | 2.01 | 220 |
| 19c | 400 | 8 | 4.01 | 220 |
| 19d | 400 | 20 | 10.0 | 220 |

These products have attached p-$C_6H_4$—$CO_2Na$ groups.

The pellets produced from this process were dried, then ground using a 8 inch jet mill (Sturtevant, Boston, Mass.) to convert the pellets to a 'fluffy' type product. This process is described in Perry's Chemical Engineers' Handbook, 6th Ed., R. H. Perry and D. Green Eds., page 8–46, incorporated herein by reference. These ground materials were used in Example 20

EXAMPLE 20

Evaluation of Carbon Black Products in a Gloss ink Formulation

The carbon black products of Examples 19a–19d were evaluated in a standard heat set gloss ink formulation prepared on a three roll mill as described in Example 18. All testing was carried out as described in Example 18. The carbon black product 19a was the control. Samples were weight compensated for the amount of treatment applied: 19a, 15.0 g, 19b, 15.2 g; 19c, 15.3 g; 19d, 15.8 g.

Fineness of grind data and viscosity measurements of the resulting inks are shown in the table below. The term 'hangback' indicates that the carbon black was not evenly mixed into the resin during the first mill pass.

| Properties/Samples | 19a | 19b | 19c | 19d |
|---|---|---|---|---|
| Carbon Black Properties | | | | |
| Ink Preparation | | | | |
| Grinding Base (5 scr/10 scr/sand) | | | | |
| 1 pass | 10/6/46 | Hangback | Hangback | Hangback |
| 2 pass | | back | back | back |
| 3 pass | 6/4/34 | 0/0/32 | 0/0/30 | 0/0/30 |
| 4 pass | 5/0/26 | 0/0/26 | 0/0/12 | 0/0/24 |
|  | 0/0/20 | 0/0/10 |  | 0/0/21 |
| Ink Properties | | | | |
| Steel bar Laray Viscosity | | | | |
| Viscosity (poise at 2500 s⁻¹) | 71.7 | 71.8 | 77.0 | 75.5 |
| Yield value (dyne/cm at 2.5 s⁻¹) | 832 | 655 | 715 | 785 |
| Vertical Glass Plate Flow (mm) | | | | |
| No Setting | | | | |
| 20 min. | 110 | 105 | 125 | 119 |
| 40 min. | 133 | 122 | 160 | 151 |
| 60 min. | 145 | 130 | 179 | 175 |
| 30 minutes setting | | | | |
| 20 min. | 78 | 55 | 105 | 94 |
| 40 min. | 100 | 70 | 137 | 129 |
| 60 min. | 115 | 78 | 155 | 150 |
| 60 minutes setting | | | | |
| 20 min. | 68 | 35 | 100 | 92 |
| 40 min. | 90 | 43 | 135 | 126 |
| 60 min. | 102 | 49 | 150 | 146 |
| Spreadometer Properties | | | | |
| Slope (mm) | 8.9 | 8.7 | 9.0 | 7.2 |
| Intercepter (mm) | 29.1 | 30.0 | 28.6 | 29.7 |
| Yield Value (dyne/cm²) | 94.3 | 107.9 | 102.3 | 96.2 |

The data demonstrates how the treatment modified the rheology of the ink formulation. In these cases, increasing the treatment level significantly increased the flow (vertical glass plate flow). That the flow remains high after the one hour setting time indicates that this ink composition will flow more consistently over time. This is particularly valuable in an offset ink. Additionally, the carbon black of Example 19c dispersed into the ink at a faster rate than the control example, 19a.

The spreadometer slope is also an indication of flowability, but under different shear conditions (higher values correspond to greater flow). The spreadometer intercepter is an indication of the sample's plastic viscosity Optical properties for inks made from the control carbon black, 19a, and the carbon black products 19b–19d, were determined as described in Example 18. Values for 1.0 and 2.0 micron film thicknesses were calculated from linear regression of the data from the prints made over a range of film thicknesses.

Optical Properties of a 1 micron film made from Samples 19a–d

| Example | OD | L* | a* | b* | Gloss 60° |
|---|---|---|---|---|---|
| 19a | 1.40 | 24.5 | 1.18 | 3.67 | 36.7 |
| 19b | 1.54 | 19.53 | 1.81 | 5.38 | 41.9 |
| 19c | 1.34 | 25.16 | 1.80 | 5.71 | 42.7 |
| 19d | 1.17 | 28.40 | 1.32 | 4.32 | 31.4 |

Optical Properties of a 2 micron film made from Samples 19a–d

| Example | OD | L* | a* | b* | Gloss 60° |
| --- | --- | --- | --- | --- | --- |
| 19a | 2.14 | 5.12 | 0.83 | 1.53 | 44.8 |
| 19b | 2.25 | 3.47 | 0.75 | 0.92 | 49.8 |
| 19c | 2.13 | 4.86 | 1.32 | 2.42 | 42.1 |
| 19d | 1.85 | 9.37 | 1.21 | 2.85 | 31.7 |

The data indicates that optical properties diminished somewhat on increasing treatment levels. Example 19c had improved rheology (for offset ink application), very good dispersion, and comparable optical properties to the control.

EXAMPLE 21

Preparation of a Carbon Black Product

Carbon black products with different amounts of attached groups under continuous operating conditions were prepared. 100 parts per hour of a carbon black having a t-area of 342 m$^2$/g and a DBPA of 106 mL/100 g was charged to a continuously operating pin mixer. The amounts of sulfanilic acid, sodium nitrite and water used in each example are indicated in the table below. The resultant material was dried to give a carbon black product having attached p-C$_6$H$_4$SO$_3$Na groups. Amounts of attached groups were determined by the analyses of Soxhlet extracted samples of each product for sulfur content. The results are indicated in the table.

| Carbon from Example # | Sulfanilic Acid (parts per hour) | NaNO$_2$ (parts per hour) | Deionized Water (parts per hour) | mmol S attached/g Products | µmol S attached/m$^2$ Product |
| --- | --- | --- | --- | --- | --- |
| 21a | 3 | 1.2 | 115 | 0.15 | 0.44 |
| 21b | 5 | 2 | 115 | 0.18 | 0.52 |
| 21c | 7 | 2.8 | 115 | 0.28 | 0.82 |
| 21d | 9 | 3.6 | 115 | 0.34 | 1.0 |
| 21e | 15 | 6.0 | 115 | 0.54 | 1.6 |

EXAMPLE 22

Carbon Black Product Treated with Various Levels of Sulfanilic Acid Used in a Urethane Hardened Acrylic Formulation This example was carried out as described in Example 17. Carbon black products from Examples 21 a–e were used in the compositions. Milling time for each example was 60 min.

| Carbon from Example # | Optical Density | L* | a* | b* | gloss (60°) | Hegman Grind at 60 min |
| --- | --- | --- | --- | --- | --- | --- |
| 21a | 2.98 | 0.95 | −0.01 | −0.05 | 82.1 | 6.1 |
| 21b | 2.94 | 0.99 | 0.01 | −0.08 | 81.5 | 6.8 |
| 21c | 3.20 | 0.69 | −0.08 | −0.28 | 88.8 | 6.8 |
| 21d | 3.28 | 0.48 | −0.07 | −0.14 | 90.8 | 7.3 |
| 21e | 2.92 | 0.89 | 0.01 | −0.09 | 89.0 | 7.0 |

In this formulation, improved optical density, jetness, and gloss were found for the product of Example 21d. Carbon products with higher or lower levels of attached organic groups did not perform as well with respect to the color properties of the coating.

EXAMPLE 23

Preparation of Carbon Black Products

This procedure describes the preparation of a carbon black product under continuous operating conditions. 100 parts per hour of a carbon black having a CTAB surface area of 361 m$^2$/g and a DBPA of 117 mL/100g was charged into a continuously operating pin mixer with 9 parts per hour of sulfanilic acid and 3.8 parts per hour of sodium nitrite as an aqueous solution. The resultant material was dried to give a pelleted carbon black product having attached p-C$_6$H$_4$SO$_3$Na groups. Analysis of a sample that had been extracted with 90% ethanol overnight in a Soxhlet extractor showed that the product had 0.35 mmol/g of attached sulfonate groups, or 0.97 micromoles/m$^2$ attached sulfonate groups. A sample of this product was ground using a four inch jetmill at 3 1b/hr to give a fluffy material.

EXAMPLE 24

Use of Carbon Black Products in Coating Compositions

This example illustrates the use of carbon black products in thermoset acrylic compositions containing another pigment. The standard carbon black was a surface treated carbon black with a nitrogen surface area of 560 m$^2$/g, a DBPA of 100 mL/100 g and a volatile content of 9.5%. The materials evaluated here were prepared in Example 23.

The coating compositions were prepared as follows:

Composition A: A one quart vessel was charged with 15.1 g of carbon black, 238.4 g of ACRYLOID AT400 resin, 23.6 g of butyl acetate, 23.6 g of ethylene glycol monomethyl ether acetate and 11.8 g of xylene and mixed at 6000 rpm with an impeller mixer. A mill base was prepared by adding 900 g of #550 steel shot and grinding the mixture on a shotmill until a Hegman grind of 7.5 was obtained. A letdown vehicle was prepared by rolling 564.4 g of ACRYLOID AT400 resin, 260 g CYMEL 325 melamine-formaldehyde resin, 27 g of butyl acetate, 27 g of ethylene glycol monomethyl ether acetate and 13.5 g of xylene in a one gallon can for four hours. A mixture of the mill base (200 parts) and 255 parts of the letdown vehicle were mixed for 15 min. at 3000 rpm with an impeller mixer.

Composition B: A one half gallon ceramic ball mill was charged with 2 kg of 20 mm ceramic media, 204 g ACRYLOID AT400 resin, 356 g DuPont R900 TiO2. 16 g of butyl acetate, 16 g of ethylene glycol monomethyl ether acetate and 8 g of xylene. The mill jar was turned on a jar rolling mill operating at 82 rpm for four hours to a Hegman grind of 7.5. An additional 241 g ACRYLOID AT400 resin, 88.9 g CYMEL 325 melamine-formaldehyde resin, 18.3 g of butyl acetate, 18.3 g of ethylene glycol monomethyl ether acetate, and 9.2 g of xylene were added and the mixture was rolled on the ball mill for another four hours.

Composition C: Blends of Composition A and Composition B were mixed on a paint shaker for 30 min.

Drawdowns of samples of Composition C were made on glass plates using a 6 mil Bird applicator, flashed at room temperature for 5–10 mins., and cured in an oven for 25 min. at 100° C. The L*, a*, b* values were measured. As can be seen from the table below, the pelleted and fluffy carbon black products of Example 23 exhibited greater tinting strength than the control black. When all the carbon samples were ground for a period of 40 mins. in the preparation of Composition A, similar results were found for the pelleted material but not for the fluffy material.

| Carbon product | Compostion A, parts | Composition B, parts | Carbon Black % in Composition C | Samples tested | L* | a* | b* |
|---|---|---|---|---|---|---|---|
| Control | 20 | 20 | 1.06 | 3 | 50.25 | −1.29 | −2.98 |
| Example 23[a] | 20 | 20 | 1.06 | 2 | 37.76 | −1.06 | −2.50 |
| Example 23[a] | 12.5 | 20 | 0.82 | 1 | 44.38 | −1.14 | −2.49 |
| Example 23[b] | 20 | 20 | 1.06 | 3 | 49.60 | −1.50 | −4.44 |

[a] = pelletized
[b] = fluffy

EXAMPLE 25

Preparation of Carbon Black Products

This procedure describes the preparation of a carbon black product under continuous operating conditions. 100 parts per hour of a carbon black having a CTAB surface area of 361 $m^2/g$ and a DBPA of 117 mL/100g was charged into a continuously operating pin mixer with sulfanilic acid and sodium nitrite as an aqueous solution. A portion of the resultant material was dried to give carbon black products having attached $p\text{-}C_6H_4SO_3Na$ groups. The concentration of the $p\text{-}C_6H_4SO_3Na$ groups were determined from sulfur analysis of samples that had been extracted with methanol overnight in a Soxhlet extractor.

| Example | Parts/hr. sulfanilic acid | Parts/hr. $NaNO_2$ | Parts/hr. Water | μmol $C_6H_4SO_3Na$ attached/g | μmol $C_6H_4SO_3Na$ attached/$m^2$ | 325 Mesh residue % |
|---|---|---|---|---|---|---|
| 25a | 25.4 | 10.0 | 75 | 1220 | 3.38 | 0.05 |
| 25b | 20.1 | 8.1 | 75 | 940 | 2.60 | 0.02 |
| 25c | 18 | 7.0 | 75 | 860 | 2.38 | 0.58 |
| 25d | 16.6 | 6.6 | 75 | 800 | 2.22 | 1.24 |
| 25e | 14.9 | 5.9 | 75 | 680 | 1.88 | 1.99 |

EXAMPLE 26

Use of Carbon Black Products in Coating Compositions

This example illustrates the use of the carbon black products of Example 25 in aqueous thermoset acrylic compositions. The coating compositions were prepared as follows:

Composition A: Water (57.8 g), 0.1 g of Patco 845 defoamer, and 3.4 g of dimethylethanolamine were mixed for five minutes using a low shear mixer. Cargill 17–8241 acrylic resin (34.4 g) and 4.3 g SURFYNOL CT136 surfactant were added and the composition was mixed for an additional ten minutes with a low shear mixer. Patco 845 defoamer is available from American Ingredients Co., Kansas City, Mo. Cargill 17–7241 acrylic resin is available from Cargill, Inc., Minneapolis, Minn. SURFYNOL CT136 is a registered trademark of Air Products and Chemicals, Inc., Allentown, Pa.

Composition B: Water (68.5 g), 23.0 g of Cargill 17–7241 acrylic resin, 2.7 g of dimethylethanolamine, 5.4 g of Cargill 23–2347 melamine resin, and 0.3 g of BYK-306 surfactant were mixed with a low shear mixer for ten minutes. Cargill 23–2347 melamine resin is available from Cargill, Inc., Minneapolis, Minn. BYK-306 is a registered trademark for surfactants produced and sold by BYK-Chemie USA, Wallingford.

Composition C: A 10 wt % dispersion of the carbon black products of Example 25 was prepared by adding the carbon black product to water and stirring under low shear for about 15 mins. Composition A (3.2 g) was added to 2.5 g of the carbon black product dispersion and mixed for 15 minutes using a magnetic stirrer. Composition B (19.3 g) was added and the resulting material was mixed for an additional 15 minutes with a magnetic stir bar. The coating composition was allowed to stand overnight before use.

The coatings were drawn down on lenetta paper with a 3 mil Bird applicator and dried at 163° C. for 15 minutes. The table below shows that coatings with improved jetness are obtained when carbon black products having reduced treatment levels are used.

| Carbon from Example | μmol $C_6H_4SO_3Na$ attached/$m^2$ | L* | a* | b* |
|---|---|---|---|---|
| 25a | 3.38 | 1.81 | −0.16 | −0.03 |
| 25b | 2.60 | 1.55 | −0.02 | 0.01 |
| 25c | 2.38 | 1.30 | 0.03 | 0.02 |
| 25d | 2.22 | 1.16 | 0.04 | 0.06 |
| 25e | 1.88 | 1.19 | −0.03 | −0.03 |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A modified carbon product comprising carbon having attached at least one organic group, the organic group comprising a) at least one aromatic group or a $C_1$–$C_{12}$ alkyl group, and b) at least one ionic group, at least one ionizable group, or a mixture of an ionic group and an ionizable group, wherein the at least one aromatic group or $C_1$–$C_{12}$ alkyl group of the organic group is directly attached to the carbon and the organic group is present at a level of from about 0.10 to about 2.7 micromoles/$m^2$ of the carbon used based on CTAB or t-area of the carbon, or in an amount such that the modified carbon product has a residue value of more than about 5 wt %.

2. The composition of claim 1, wherein levels of the organic group are from about 0.4 to about 2.5 micromoles/$m^2$ of the carbon used based on CTAB or t-area of the carbon.

3. The composition of claim 1, wherein the ionic or the ionizable group is a carboxylic acid or a salt thereof.

4. The composition of claim 1, wherein the ionic or the ionizable group is a sulfonic acid or a salt thereof.

5. The composition of claim 1, wherein the organic group is a sulfophenyl group or a salt thereof.

6. The composition of claim 1, wherein the organic group is p-sulfophenyl or a salt thereof.

7. The composition of claim 1, wherein the organic group is $p\text{-}C_6H_4SO_3Na$.

8. The composition of claim 1, wherein the organic group is a carboxyphenyl group or a salt thereof.

9. The composition of claim 1, wherein the organic group is a p-carboxyphenyl group or a salt thereof.

10. The composition of claim 1, wherein the organic group is a p-$C_6H_4CO_2H$ group.

11. The composition of claim 1 wherein the ionic or the ionizable group is a quaternary ammonium salt.

12. The composition of claim 1, wherein the organic group is $3C_5H_4N(C_2H_5)^+X^-$, $C_6H_4NC_5H_5^+X^-$, $C_6H_4COCH_2N(CH_3)_3^{+X^-}$, $C_6H_4COCH_2(NC_5H_5)^+X^-$, $3C_5H_4N$ $(CH_3)^+X^-$, $C_6H_4N(CH_3)_3^+X^-$, and $C_6H_4CH_2N(CH_3)_3^+X^-$, wherein $X^{31}$ is a halide or an anion derived from a mineral or organic acid.

13. The composition of claim 12, wherein the organic group is $C_6H_4NC_5H_5^+X^-$ or $C_6H_4N(CH_3)_3^+X^-$.

14. The composition of claim 1, wherein the organic group is a carboxy-hydroxy phenyl group or its salt.

15. The composition of claim 1, wherein the organic group is 4-carboxy-3 hydroxy phenyl.

16. The composition of claim 1, wherein the carbon is carbon black, graphite, carbon fiber, vitreous carbon, finely-divided carbon, activated charcoal, activated carbon, or mixtures thereof.

17. The composition of claim 16, wherein the carbon is carbon black.

18. The composition of claim 1, wherein the aromatic ring of the aromatic group is an aryl group.

19. The composition of claim 1, wherein the aromatic ring of the aromatic group is a heteroaryl group.

20. The composition of claim 1, wherein the organic group has one or more groups selected from R, OR, COR, COOR, OCOR, halogen, CN, $NR_2$, $SO_2NR(COR)$, $SO_2NR_2$, NR(COR), $CONR_2$, $NO_2$, $SO_3M$, $SO_3NR_4$, and N=NR'; wherein R is independently hydrogen, $C_1$–$C_{20}$ substituted or unsubstituted alkyl, $C_3$–$C_{20}$ substituted or unsubstituted alkenyl, $(C_2$–$C_4$ alkyleneoxy$)_xR''$, or a substituted or unsubstituted aryl; R' is independently hydrogen, $C_1$–$C_{20}$ substituted or unsubstituted alkyl, or a substituted or unsubstituted aryl; R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; M is H, Li, Na, Cs, or K; and x is an integer ranging from 1–40.

21. The composition of claim 1 wherein the modified carbon product has further attached to the carbon an aromatic group of the formula $A_yAr-$, in which Ar is an aromatic radical selected from the group consisting of phenyl, naphthyl, anthracenyl, phenanthrenyl, biphenyl, pyridinyl and triazinyl;

A is hydrogen, a functional group selected from the group consisting of R, OR, COR, COOR, OCOR, halogen, CN, $NR_2$, $SO_2NR_2$, $SO_2NR(COR)$, NR(COR), $CONR_2$, $NO_2$, $SO_3M$, $SO_3NR_4$, and N=NR'; or A is a linear, branched or cyclic hydrocarbon radical, unsubstituted or substituted with one or more of said functional groups;

R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R''$ or a substituted or unsubstituted aryl;

R' is hydrogen, a $C_1$–$C_{20}$ substituted or unsubstituted alkyl, or a substituted or unsubstituted aryl;

R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or a substituted or unsubstituted aroyl; x is from 1–40;

M is H, Li, Na, Cs, or K; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

22. A non-aqueous coating composition comprising a non-aqueous solvent and the modified carbon product of claim 1.

23. A non-aqueous ink composition comprising a non-aqueous vehicle and the modified carbon product of claim 1.

24. An aqueous coating composition comprising water and the modified carbon product of claim 1.

25. An aqueous ink composition comprising water and the modified carbon product of claim 1.

26. A non-aqueous ink or coating composition comprising a modified carbon product and a non-aqueous solvent or vehicle, wherein the modified carbon product comprises carbon having attached at least one organic group, the organic group comprising a) at least one aromatic group, and b) at least one ionic group, at least one ionizable group, or a mixture of an ionic group and an ionizable group, wherein the at least one aromatic group of the organic group is directly attached to the carbon.

27. A method to increase flow of an ink as measured by glass plate flow, comprising incorporating into the ink a modified carbon product of claim 1.

28. A coating composition comprising water or a non-aqueous solvent, the modified carbon product of claim 1, and a coloring pigment other than carbon black.

29. A coating composition comprising water or a non-aqueous solvent, the modified carbon product of claim 2, and a coloring pigment other than carbon black.

30. A coating composition comprising water or a non-aqueous solvent, the modified carbon product of claim 3, and a coloring pigment other than carbon black.

31. A coating composition comprising water or a non-aqueous solvent, the modified carbon product of claim 4, and a coloring pigment other than carbon black.

32. A coating composition comprising water or a non-aqueous solvent, the modified carbon product of claim 5, and a coloring pigment other than carbon black.

33. A coating composition comprising water or a non-aqueous solvent, the modified carbon product of claim 6, and a coloring pigment other than carbon black.

34. A coating composition comprising water or a non-aqueous solvent, the modified carbon product of claim 7, and a coloring pigment other than carbon black.

35. A coating composition comprising water or a non-aqueous solvent, the modified carbon product of claim 8, and a coloring pigment other than carbon black.

36. A coating composition comprising water or a non-aqueous solvent, the modified carbon product of claim 10, and a coloring pigment other than carbon black.

37. A coating composition comprising water or a non-aqueous solvent, the modified carbon product of claim 11, and a coloring pigment other than carbon black.

38. A coating composition comprising water or a non-aqueous solvent, the modified carbon product of claim 12, and a coloring pigment other than carbon black.

39. A coating composition comprising water or a non-aqueous solvent, the modified carbon product of claim 17, and a coloring pigment other than carbon black.

40. A coating composition comprising water or a non-aqueous solvent, the modified carbon product of claim 20, and a coloring pigment other than carbon black.

41. A coating composition comprising water or a non-aqueous solvent, the modified carbon product of claim 21, and a coloring pigment other than carbon black.

42. The coating composition of claim 26, further comprising a coloring pigment other than carbon.

43. A coating composition comprising water or a non-aqueous solvent, the modified carbon product of claim 1 and clay, talc, silica, or a carbonate.

* * * * *